Sept. 2, 1969  E. E. FRENCH  3,464,264
PNEUMATIC TIRE RUN-IN MACHINE
Filed April 24, 1967  3 Sheets-Sheet 1

INVENTOR
ELBY EDWARD FRENCH
BY Walter H. Schneider
ATTORNEY

Sept. 2, 1969  E. E. FRENCH  3,464,264
PNEUMATIC TIRE RUN-IN MACHINE
Filed April 24, 1967  3 Sheets-Sheet 2

INVENTOR
ELBY EDWARD FRENCH

BY *Walter H. Schneider*

ATTORNEY

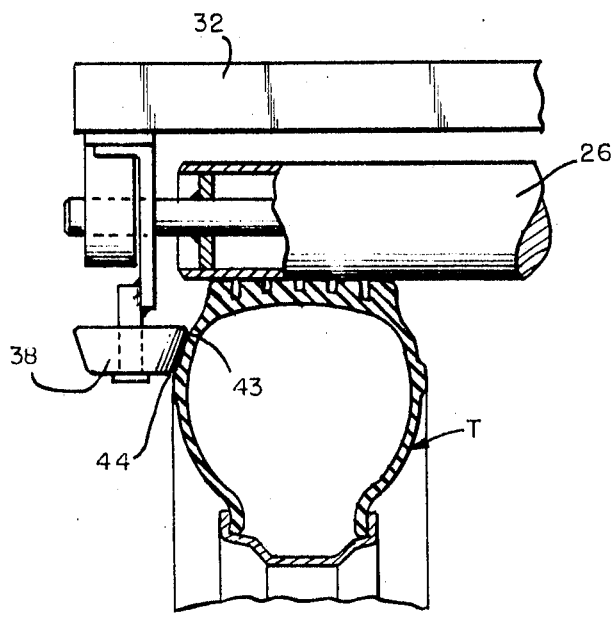
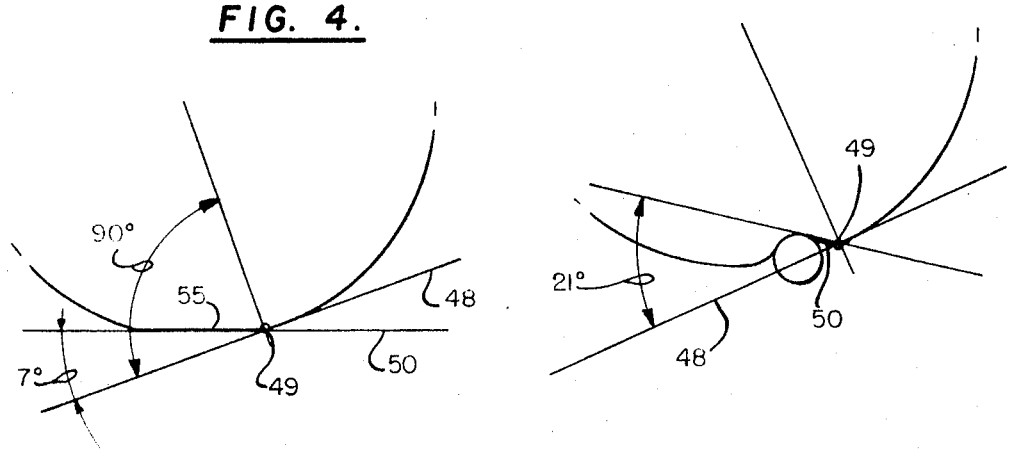

ated Sept. 2, 1969

United States Patent Office 3,464,264
Patented Sept. 2, 1969

3,464,264
PNEUMATIC TIRE RUN-IN MACHINE
Elby Edward French, Littleton, Colo., assignor to O.K. Tire and Rubber Co., Inc., Houston, Tex., a corporation of Delaware
Filed Apr. 24, 1967, Ser. No. 633,086
Int. Cl. B60c *19/10;* G01m *17/02*
U.S. Cl. 73—146                                    11 Claims

ABSTRACT OF THE DISCLOSURE

This disclosure relates to a pneumatic tire run-in machine which is designed to flex a pneumatic tire and thereby simulate the flexing and load conditions imposed on the tire during normal operation. The run-in apparatus comprises a plurality of rollers arranged around a circle within which the tire is suspended and rotated with at least one of the rollers driving the tire. At least one of the rollers is adapted to be moved into and out of engagement with the tire and to exert force against the tire.

Background of the invention

Before a tire may be trued or properly balanced, it is first necessary to check the roundness of the tire. A tire which is out of round by as little as $\frac{1}{32}$ of an inch will be unsatisfactory in operation and must be trued. The out of round condition is removed by a trueing machine which essentially cuts excess rubber from the tire as it is rotated. Before a tire may be mounted on a trueing machine, it is first necessary to remove any temporary flat spots the tire may have acquired while mounted on a standing car or by standing in a rack. A pneumatic tire mounted on an automobile may acquire a flat spot in as short a time as 10 minutes if left standing. These temporary flat spots cause the familiar "morning thump" in nylon tires and must be removed before the tire may be trued or balanced.

If the tire is trued or balanced with a temporary flat spot in it, the flat spot will then become a high spot when the tire is operating upon a roadway. This high spot will cause the tire tread again to be out of round which will result in tire bounce. Temporary flat spots must also be removed prior to balancing, as a tire that is balanced with a flat spot will be out of balance when the flat spot disappears in the course of normal operation.

The prevailing practice heretofore has been to mount the tire that is to be trued or balanced on an automobile and drive it for 15 or 20 minutes or more to heat the tire to its normal operating temperature and "work out" any temporary flat spots or casing distortions. When the automobile is returned to the tire shop, the tire is removed immediately (before it can cool off) and placed on a trueing or balancing machine. While this method is generally successful in eliminating temporary flat spots, it necessitates an undue expenditure of labor in driving the car and removing any stones that may have lodged in the cracks of the tire tread. Any stones wedged in the cracks may seriously damage the cutting blades in a trueing machine.

Objects

It is an object of this invention to provide a pneumatic tire run-in device for flexing a pneumatic tire and thereby heating the tire sufficiently for removing temporary casing distortions, including flat spots.

It is another object of this invention to provide a tire run-in device which will result in substantial savings of time in preparation for trueing and balancing tires.

It is another object of this invention to provide a simple, inexpensive and trouble-free device which may be operated with safety by tire mechanics.

Still another object of the invention is to provide a tire run-in apparatus having small diameter rollers for flexing a tire tread inwardly and thereby subject the tire to a greater amount of flexing than it would undergo in normal operation for the same period of time.

Brief summary of invention

The foregoing objects of the invention are accomplished by apparatus for rotating a pneumatic tire within a plurality of tire engaging means, which are situated at spaced intervals around the tire. At least one of these tire engaging means is driven and is used to impart rotation to the tire. At least one of the tire engaging means is provided with a loading means that is designed to be moved into and out of engagement with the tire and to exert a substantial force against the tire.

Brief description of the drawings

FIGURE 3 is a sectional end view of the top mounted load roller taken along line 3—3 of FIGURE 1.

FIGURE 4 illustrates the flex angle of a pneumatic tire while at rest on at flat surface.

FIGURE 5 illustrates the flex angle encountered by a pneumatic tire while loaded by a 3-inch diameter load roller.

Figure 1:
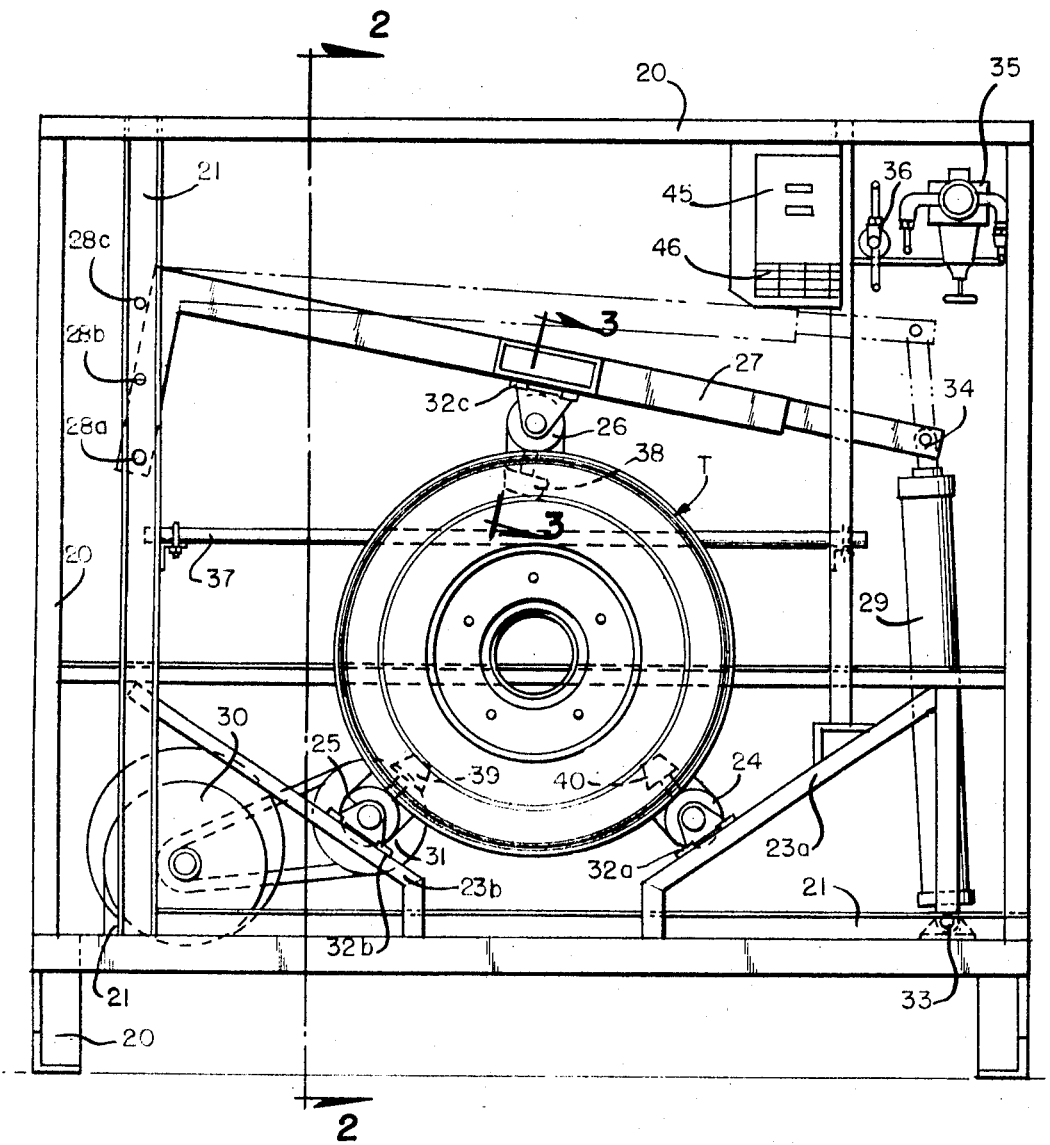
FIGURE 1 is a front elevation view from the operator's side with a tire inserted for operation.

Description of a preferred embodiment of the apparatus

Referring with greater detail to the drawings, a generally rhombic frame structure is indicated by numeral 20. An expanded metal barrier 52 is secured to the exterior of frame 20 to shield operating personnel from the moving parts, but most of the barrier has been omitted from the drawings for the sake of clarity. Mounted within frame 20 is an inclined sub-frame 21 with a generally rectangular structure. This sub-frame is mounted within frame 20 at an angle of 75° from the horizontal or 15° from the vertical. Mounted within sub-frame 21 are four generally triangular braces 23*a*, 23*b*, 23*c* and 23*d*, which provide support for two roller cradles 32*a* and 32*b*.

Mounted on an upright member of sub-frame 21 is an L-shaped beam 27. Mounted on the underside of beam 27 is cradle 32*c*. Three rollers 24, 25 and 26 are mounted at spaced points about a circle in cradles 32*a*, 32*b*, and 32*c*, respectively, so as to peripherally engage and provide support for a mounted, normally inflated pneumatic tire generally indicated as T. The rollers are mounted in the cradles 32*a*, 32*b* and 32*c* with their rotating axes substantially parallel. However, perfect parallelism is not required, and in fact it has been found desirable to provide a slight "toe-in," e.g. on the order of one degree; that is, the rotating axes of the rollers diverge slightly toward the side to which the sub-frame and the tire are inclined.

The effect of the aforesaid "toe-in" is to urge the tire, as it rotates, towards and against the rollers 38, 39 and 40, which are mounted in sub-frame 21 at angularly spaced positions so as to contact the side-wall or shoulder of the tire on the side toward which the sub-frame 21 and the tire lean. It is preferred, but by no means essential, that the tapered rollers 38, 39 and 40 be mounted on the cradles 32*a*, 32*b* and 32*c* adjacent the rollers 24, 25 and 26, respectively. The rollers 38, 39 and 40 are tapered to match the taper of the side-wall or shoulder of the tire. The taper avoids a scuffing action which would occur if roller 38 were flanged and/or untapered. Due to the fact that the portion of the tire indicated by numeral 43 is at a greater radial distance from the tire axis than that portion indicated by numeral 44, rotation of the tire will result in differing angular velocities at points 43 and 44. The tapered roller 38 is designed to accommodate this difference in angular velocity.

The short arm of the L-shaped beam 27, previously mentioned, is adapted to be secured to and pivot about any one of three different pivot points, 28a, 28b and 28. The pivotal movement is provided to provide for moving roller 26 in and out of tire engaging position to facilitate introduction and removal of tires. There would be no departure from the spirit of the invention to provide any other suitable means or structure for carrying out this function. For instance, instead of a pivotable beam 27, the roller 26 could be carried by a radially disposed reciprocating member. However, the construction shown in the drawings is preferred and will thus be described in further detail.

The movable end of beam 27 is connected to a pneumatic load cylinder 29 which is mounted on sub-frame 21. Load cylinder 29 is pivotally mounted at 33 and 34 to allow for the movement of beam 27 as it travels through an arcuate path around pivot point 28a. Load roller 26 is mounted midway between pivot point 28a and load point 34. This positioning of roller 26 causes a 2 to 1 mechanical advantage to be exerted by load cylinder 29 against the tire through roller 26. Load cylinder 29 is controlled by variable air pressure. The air pressure is piped through regulator 35 to a 4-way valve 36. Load cylinder 29 is a 2-way pneumatic cylinder with a power extend and power retract drive. The 4-way valve 36 enables the operator to select between an "off" position, a "power up" position, and "power down" position, while regulator 35 regulates the amount of air pressure that is supplied to cylinder 29. Through suitable adjustment of regulator 35, the amount of load exerted on the tire can be controlled.

In the preferred embodiment of the invention, a load cylinder is used which will supply an output force which is approximately 7 times the input pressure in pounds per square inch; that is, when the cylinder is supplied with a given number of pounds of air pressure per square inch it will generate a force of 7 times the given number of pounds at pivot point 34. Thus, when the operator sets the input to load cylinder 29 to a selected pressure via regulator 35 e.g. 71½ pounds, the force applied to the end of the beam 27 is 500 lbs. This load is again further amplified by the 2:1 mechanical advantage of beam 27. Thus, the load exerted on the pneumatic tire would be 1000 lbs. It should be understood that the foregoing output force, mechanical advantages and operating pressure are exemplary only and do not constitute limitations on the invention. Thus, the kind of cylinder, the mechanical advantage of beam 27 and the operating pressure may all be varied as desired. It is preferred, however, that these variables be selected to produce pressures which simulate normal loadings for the tire being run-in.

The purpose of making beam 28 adjustable between points 28a, 28b and 28c is to facilitate the accommodation of tires of widely varying size. Vehicles in use at this time employ tires ranging in size from 520 x 13 to 820 x 15. The tire run-in device is preferably, though by no means essentially, sized to accommodate tires ranging in size from 520 x 13 to 750 x 14 when the beam 27 is in the position shown in FIGURE 1; that is, with the pivot point of beam 27 at 28a. Tires ranging in size from 800 x 14 to 760 x 15 are operated in the second position shown at 28b. The larger tires ranging from 760 x 15 to 820 x 15 are operated with the pivot point at 28c. The apparatus is preferably provided with a chart mounted on the machine at 46 which indicates the proper pivot point (28a, 28b, or 28c), and the proper operating pressure to use with each given size tire that can be accommodated in the machine.

In order to assist in positioning the tire while the rollers 26 and 38 are withdrawn from tire engaging position (with cylinder 29 extended and beam 27 in up position), a temporary tine supporting means, e.g. guide bar 37, is secured to sub-frame 21 adjacent that position in said frame wherein the tire is supported and on the side toward which the sub-frame and tire are inclined. A movable or fixed temporary tire supporting means may be employed without departing from the spirit of the invention, but the fixed bar 37, positioned so as to support the upper portion of the tire on the side to which it inclines, is very simple and performs its assigned function dependably, and is therefore preferred. However, whether the temporary tire supporting means is stationary or fixed, means should be provided for maintaining it in spaced relationship with the tire during rotation thereof. In the present embodiment, this function is performed by roller 38, which urges the tire out of contact with bar 37 as the roller assumes its tire engaging position. The bar 37 is displaced laterally from the position occupied by the tire when it is in rotating position. This will be dealt with further in the description of the operation of the apparatus.

Power to rotate the tire is provided by motor 30 mounted in sub-frame 21. It is connected by a V-belt drive to pulley 31 and drive roller 25. The surface of the drive roller 25 is preferably knurled to provide a non-slip drive for the tire.

Motor 30 is geared through a V-belt drive 31 to maintain the drive roller 25 at any desired peripheral angular velocity, preferably approximately 660 feet per minute. This angular velocity is equivalent to a driving speed of 7½ miles an hour.

Many variations can be made in the arrangement of the rollers, their supports, the means for rotating them and the means for moving them in and out of engagement with the tire without departing from the spirit of the invention. For instance, it would be possible to mount the motor 30 on beam 27 rather than on frame 21. However, it should be pointed out that if the motor were mounted on beam 27, and the operator desired to change beam pivot point from 28a to 28b, the increased weight of the driving mechanism would require some sort of mechanical lifting assistance to raise the beam to the next pivot point. With the motor in the position illustrated on the drawing, the pivot position can readily be changed by the operator. It would also be possible to employ more than one driving roller with no substantial change in the function of the machine. However, additional driving rollers would require either an additional power means or a power transmission means to connect the additional drive rollers. It would also be possible to mount a plurality of load rollers on beam 27 and have a single driving roller on frame 21. This arrangement, however, would not add my advantages to the device shown in FIGURE 1 and would only add to the complexity and cost.

Principles of operation

The internal heat generated within a rolling, loaded tire is a function of several variables. These variables include the load, the amount of tire tread, the size of the tire, the inflated pressure of the tire, and the surface upon which the tire is rotating. A tire with a full body of tread will reach an operating temperature almost twice as fast as a bald tire. This is primarily because the body of tread acts as a heat sink and absorbs and retains the generated heat. Since rubber is a poor conductor, the heat is effectively retained within the tire rather than being conducted away by its surroundings.

The air pressure, the inflated pressure of the tire, the load and the smoothness of the surface over which the tire is rolling all affect the flex angle of the tire. When the flex angle is large, the amount of internal flexing that will occur in the tire as it rolls will be relatively large, and as a direct result, the rate at which heat is generated in the tire will be large. Because the apparatus of the invention is able to produce a greater flex angle in a tire than is usually obtained in driving, the invention provides a more efficient way of running-in a tire.

The flex angle referred to above is illustrated in FIGURES 4 and 5. As illustrated in FIGURE 4, the flex angle of a tire engaged with a smooth road surface is measured between (a) the tangential line 48 which is a line drawn tangent to the tire at the point of contact 49 with the pavement and (b) the flattened portion of the tire which contacts and coincides with the road surface, represented herein as line 50. In a normally inflated tire with an average load condition standing on a flat pavement, a typical flex angle would be around 7°. This would vary of course, as the inflation of the tire and the load varies.

A tire which is deflected by a small diameter roller, e.g. a three inch diameter roller, may have a much greater flex angle, e.g. almost 21°. This is because the small diameter roller is able to distort the tread beyond the normal horizontal flex line 50 to a position radially inward of the normal flex line by approximately 1 inch or so, thus achieving a flex angle on the order of 21°. In this case, the flex angle is measured between lines drawn tangent to the tire at the point where the normal curvature of the tire is "broken" by the roller. This is illustrated in FIGURE 5, by lines 48 and 50.

The preferred roller diameter is best expressed in terms of the "footprint" of the tire. This term, which is recognized in the art, refers to the flattened portion of the tire which contacts the roadway when a normally inflated tire is in place on a normally loaded vehicle. The footprint will have a certain width, generally corresponding to the width of the tire tread, and a certain length. It is preferred to employ rollers 24, 25 and 26 which have diameters no greater than the length of the footprint of the tires to be un-in in the machine. A three inch roller diameer has been used with success, but greater and smaller diameters, e.g. about 2 inch to about 5 inch are possible.

The efficiency of the apparatus of the invention is enhanced by the fact that the tire is flexed several times (equal to the number of rollers) for each revolution. Thus, whereas a tire may have to be driven upon for 15 to 20 minutes at 20 to 30 miles per hour to bring it to normal operating temperature and remove all temporary flat spots, the same results can be achieved in this machine in 5 minutes or so of operation. When one wishes to true or balance a tire which is not already installed on a vehicle, as is often the case, the time and labor savings are substantial, as the operator is spared the work of mounting and demounting the tires prior to trueing or balancing, is spared the lost time involved in driving the car around to warm up the tires and is free to do other work while the tire is being run-in in the machine.

The machine is capable of reproducibly developing any desired temperature in a series of similar tires. Experiments have shown that by overloading the tire and flexing it for as long as 30 minutes, temperatures approaching 300° may be generated. It is desired, however, for the purposes of the invention, to keep the operating temperature under 200°. Any moisture which is trapped in the body of the tire can be vaporized if a temperature over 212° F. is attained, and may cause tread or cord separation.

Operation of the invention

The preferred manner of operating the apparatus of the invention is to select operating pressures which will exert the same force on the tire through roller 26 as would be exerted on it by a normally loaded vehicle of the type and weight for which the tire was designed. Among the most widely used (at this time) tire sizes are 775 x 14, 825 x 14 and 775 x 15. The gross weight of an automobile on which a 775 x 14 tire is mounted normally runs from 3,500 to 3,700 pounds. The gross loaded weight of an automobile upon which a 825 x 14 tire is mounted runs from about 3,700 to 4,000 pounds and the gross weight of the automobile upon which a 775 x 15 is mounted runs between 3,900 pounds and 4,200 pounds. Thus, the average loaded weight per tie for these individual tires is as follows: 775 x 14—900 pounds; 825 x 14—950 pounds to 1,000 pounds; and 775 x 15 —1,000 to 1,050 pounds. The details of operation will now be illustrated in reference to an 825 x 14 tire.

Figure 2:
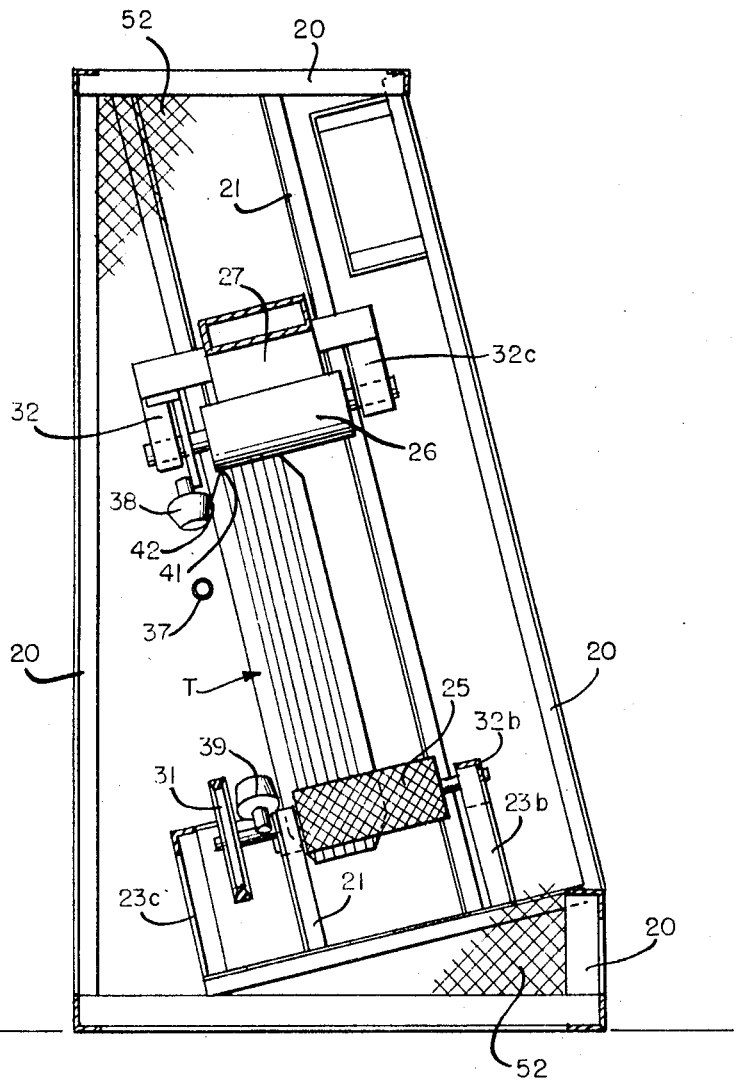
FIGURE 2 is a simplified sectional end view of the invention taken along lines 2—2 of FIGURE 1.

With the tire mounted on a wheel and normally inflated, the operator raises the beam 27 to its upward position by moving the 4-way valve to its power up position, as indicated by the dotted lines in FIGURE 1. The operator then inserts the tire into the machine, placing the lower portion of the tire on rollers 24 and 25 against rollers 39 and 40, and leaning the upper portion of the tire against bar 37. The operator then steps back and moves the 4-way control valve to a power down position which lowers the beam 27. As the tapered roller 38 descends, it strikes the shoulder of the tire at point 41 on the shoulder of the tire. Due to the tape of roller 38 and the taper of the shoulder of the tire between points 41 and 42, the tire is forced out of contact with the temporary supporting means, guide bar 37, to the position shown in FIGURE 2. In this manner the tire is automatically centered for rotation within rollers 24, 25 and 26 without touching bar 37. If the operator were required to hold the tire in place while the beam 27 was lowered, serious injury could result if the operator inadvertently placed his hand between the tire and roller 26. The operator then energizes motor 30 by the starter 45 to cause the tire to rotate. As mentioned previously the tire is rotated at a peripheral speed of 660 feet per minute while the r.p.m. of the tire depends on its diameter. The operator then selects the recommended load pressure for the 821 x 14 tire, which is 950–1,000 pounds. In the present embodiment of the invention, such a load pressure may be achieved by applying a pressure of 69.5 pounds per square inch to cylinder 29 through adjusting regulator 35. After five minutes of operation under this pressure, the tire may be removed from the machine and promptly balanced or trued. If desired, one tire may be balanced or trued while the next is being run-in.

While I have shown and described a preferred embodiment of the tire run-in machine and certain modifications thereof, it will be understood that the same is capable of other modifications not specifically mentioned herein, and all such modifications as may be made without departure from the spirit and scope of the invention are intended to be embraced.

What is claimed is:

1. Pneumatic tire run-in machine for flexing a pneumatic tire comprising:
  (a) a frame;
  (b) a plurality of rotatable tire engaging means mounted on said frame, said tire engaging means being situated at spaced-apart positions on said frame to circumferentially support a pneumatic tire.
  (c) at least one movable and rotatable tire engaging means mounted on said frame, said movable means being movable into and out of a tire engaging position;
  (d) drive means mounted on said frame to drive and thereby rotate at least one of said rotatable tire engaging means; and
  (e) adjustable loading means for exerting a selectable load on said tire through at least one of said rotatable tire engaging means to flex the tire and thereby simulate operating conditions;
whereby a pneumatic tire may be rotated and loaded by said rotatable tire engaging means.

2. The pneumatic tire run-in machine as claimed in claim 1, wherein said frame is generally upright, and further comprising:
  (a) a sub-frame mounted within said frame, said sub-frame being inclined from the vertical; and
  (b) a temporary support means mounted on said sub-frame for supporting a pneumatic tire while said movable and rotatable tire engaging means is out of said tire engaging position.

3. A pneumatic tire run-in machine as claimed in claim 1, wherein there are three rotatable tire engaging means, one of which is a movable rotatable tire engaging means movable into and out of tire engaging position.

4. The pneumatic tire run-in machine as claimed in claim 1, further comprising:
   (a) a first set of rotatable tire engaging means mounted on said frame, said means having their axes of rotation toed inwardly towards the pneumatic tire; and
   (b) a second set of rotatable tire engaging means mounted adjacent to said first set of rotatable tire engaging means, said second set of means having their axes of rotation substantially perpendicular to the rotational axes of said first rotatable means;
whereby, a pneumatic tire rotated by said first set of rotatable tire engaging means is forced against said second set of rotatable tire engaging means by the toe-in of said first set of rotatable tire engaging means.

5. The pneumatic tire run-in machine as claimed in claim 4, wherein said second set of rotatable tire engaging means comprises tapered rollers in position to contact the shoulder of a tire mounted in said machine.

6. A pneumatic tire run-in machine for flexing a pneumatic tire, comprising:
   (a) a generally upright frame;
   (b) a movable load beam mounted on said frame;
   (c) at least two rotatable tire engaging means mounted for rotation on said frame, said means being spaced apart to receive and support the lower portion of a pneumatic tire;
   (d) at least one movable, rotatable tire engaging means mounted on said beam, said beam and said movable rotatable tire engaging means being positioned for contacting the upper portion of a tire supported by the aforesaid at least two rotatable tire engaging means, and for moving into and out of tire engaging position;
   (e) drive means for rotating at least one of said rotatable tire engaging means; and
   (f) load means for loading said load beam with a preselected load and for exerting said load against the periphery of said pneumatic tire.

7. A pneumatic tire run-in machine as claimed in claim 6, further comprising:
   (a) a first set of rotatable tire engaging means mounted on said frame and said beam, said means having their axes of rotation toed inwardly towards the pneumatic tire received by said rotatable tire engaging means mounted on said frame; and
   (b) a second set of rotatable tire engaging means mounted adjacent to said first set of rotatable tire engaging means, said second set of means having their axes of rotation substantially perpendicular to the rotational axes of said first rotational means;
whereby a pneumatic tire rotated by said first set of rotatable tire engaging means is forced against said second set of rotatable tire engaging means by the toe-in of said first set of rotatable tire engaging means.

8. The pneumatic tire run-in machine of claim 6, wherein said drive means rotates one of said at least two rotatable tire engaging means mounted on said frame.

9. The pneumatic tire run-in machine as claimed in claim 7, wherein said rotatable tire engaging means comprise rollers.

10. The pneumatic tire run-in machine of claim 6, wherein said load means further comprise:
    (a) a pneumatic cylinder mounted on said frame and connected to said load means; and
    (b) regulator means for varying the pneumatic pressure applied to said pneumatic cylinder;
whereby the load pressure applied to said pneumatic tire varies in proportion to the pneumatic pressure applied to said pneumatic cylinder.

11. A pneumatic tire run-in machine for flexing a pneumatic tire comprising:
    (a) a frame;
    (b) a plurality of rotatable tire-engaging means mounted on said frame, said tire-engaging means being situated at spaced-apart positions on said frame to support a pneumatic tire;
    (c) a movable load beam mounted on said frame, with at least one rotatable tire-engaging means mounted thereon, said movable load beam being movable into and out of a tire-engaging position;
    (d) drive means mounted on said frame to drive and thereby rotate at least one of said rotatable tire-engaging means;
    (e) adjustable loading means for exerting a selectable load on said tire through at least one of said rotatable tire-engaging means to flex the tire and thereby simulate operating conditions; whereby a pneumatic tire may be rotated and loaded by said rotatable tire engaging means.

References Cited

UNITED STATES PATENTS

| | | | |
|---|---|---|---|
| 2,695,520 | 11/1954 | Karsai | 73—146 |
| 2,812,583 | 11/1957 | Herzegh | 73—146 XR |
| 3,316,758 | 5/1967 | Wild | 73—146 |

DONALD O. WOODIEL, Primary Examiner